(12) United States Patent
Wilson (10) Patent No.: US 7,248,992 B2
(45) Date of Patent: Jul. 24, 2007

(54) COMBINED FEATURE DIMENSIONAL PARAMETER ANALYSIS

(75) Inventor: Bruce A. Wilson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/251,323

(22) Filed: Oct. 13, 2005

(65) Prior Publication Data

US 2006/0052977 A1    Mar. 9, 2006

Related U.S. Application Data

(62) Division of application No. 10/792,089, filed on Mar. 2, 2004, now Pat. No. 6,978,220.

(51) Int. Cl.
    *G01B 7/00* (2006.01)
(52) U.S. Cl. .................................... 702/155
(58) Field of Classification Search ............... 702/155, 702/168; 703/7, 1; 716/21; 74/89.14, 425, 74/42; 396/48; 356/237.1
    See application file for complete search history.

(56) References Cited

U.S. PATENT DOCUMENTS 4,390,955 A * 6/1983 Arimura .................. 716/21
4,754,417 A * 6/1988 Beeson et al. ............ 703/7
5,151,870 A * 9/1992 Beebe et al. ............. 702/168
6,507,806 B1 * 1/2003 Tandler .................... 703/1

OTHER PUBLICATIONS

Dimensioning and Tolerancing standard of the American Society of Mechanical Engineers (ASME) Y14.5M-1994, Department of Defense (DOD) Published by American Society of Mechanical Engineers (1994), pp. 81-155.
Wilson, Bruce A., "Design Dimensioning and Tolerancing", Publisher: Goodheart-Willcox Co; 3rd edition (Jan. 2001), pp. 187-189 and 248-251.
Foster, Lowell W., "Geo-Metrics II—The Application of Geometric Tolerancing Techniques", revised 1986 edition, pp. 281-289.

* cited by examiner

*Primary Examiner*—Carol S. W. Tsai
*Assistant Examiner*—Xiuqin Sun
(74) *Attorney, Agent, or Firm*—Ingrassia Fisher & Lorenz, P.C.

(57) ABSTRACT

A computerized method is disclosed for determining the size and location effects of simulated or manufactured features on an object, determining the transformation of a pattern of features, determining usable feature size within a pattern of features, and determining the remaining feature tolerances. The simulated or manufactured position of a pattern of features is used to determine how to translate a tolerance zone framework. Positional errors and remaining feature tolerances are determined relative to the translated design framework.

13 Claims, 12 Drawing Sheets

COMBINED FEATURE DIMENSIONAL PARAMETER ANALYSIS

CROSS REFERENCE TO RELATED APPLICATIONS

This patent application is a divisional of U.S. patent application No. 10/792,089, filed Mar. 2, 2004 now U.S. Pat. No. 6,978,220.

BACKGROUND OF THE INVENTION

The present invention generally relates to the production of articles of manufacture in a computer simulation or in the real world, and more particularly, to a method for accurately evaluating pattern compliance for a simulated or manufactured article.

American, Canadian, German, and International Organization for Standardization (ISO) standards define methods for specifying multiple levels of feature related tolerances. However, the manufacturing industry does not have an efficient or effective way of determining whether or not the requirements are achieved. Furthermore, there is no means for accurately assessing the effects of computer simulations with respect to feature relating tolerances. Inspection data of manufactured articles and varied feature data in simulations are not currently evaluated in an automated and correct manner to determine whether or not combined feature parameters such as hole size and location are acceptable to the applied feature relating tolerances. Evaluation of manufactured or simulated hole size, form, orientation, and location are all completed separately, and confidence in the accuracy of each evaluation is low.

Figure 1:
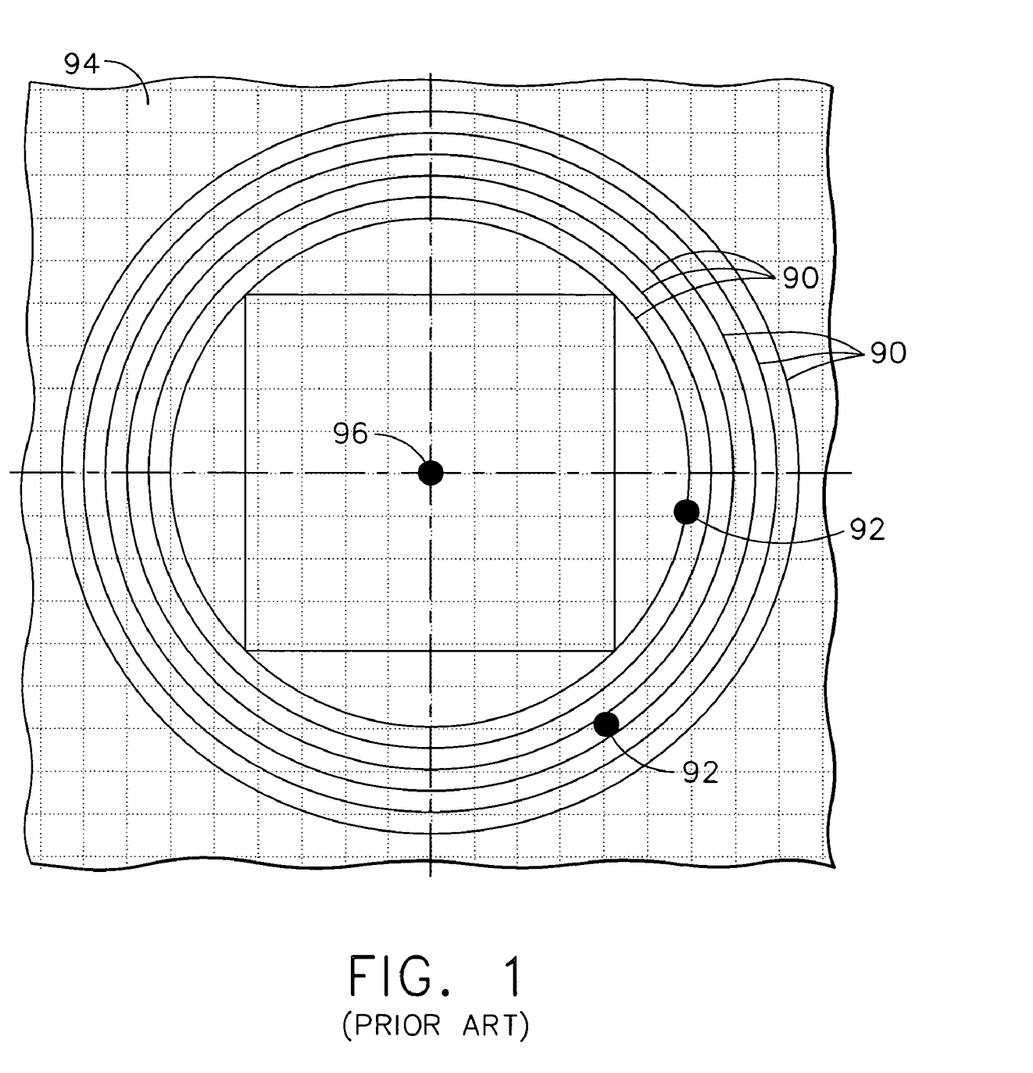
FIG. 1 is a diagram illustrating a prior art paper gaging technique for documenting inspection data.

Referring to FIG. 1, one method for documenting inspection data consists of paper gaging where information is recorded on paper. Measurements are taken, and errors are plotted on a grid 94 at an enlarged scale using a true position 96 as the origin. Hole positions 92 are then plotted on the grid 94. Concentric circles 90 representing tolerance zone diameters are then overlain to determine positional errors. A problem with this method however, is that it is time consuming because it is not automated, nor is this method used with an automated process. Another problem is the difficulty of best fitting the concentric circles 90 into a position that encompasses all the hole positions 92 within the applicable concentric circle.

Another method for documenting inspection and simulation data uses variation analysis software that assesses feature related tolerances. Approximations and iterations are used that combine size, orientation, and location variations. Multiple iterations of inspecting feature size and positions are used to increase accuracy. However, using approximations reduces accuracy, and using multiple iterations causes excessive analysis time.

As can be seen, there is a need for accurately evaluating inspection and simulation data. Also, there is a need for evaluating inspection and simulation data in a timely manner, with perhaps, using only a single iteration. Moreover, there is a need for quickly analyzing inspection and simulation data in a step of the manufacturing process so that the results of the analysis can be used in subsequent processes.

Variation effects within a pattern of features may be determined when performing a variation analysis of a design prior to manufacturing that design. The variation analysis software performs hundreds or thousands of simulated build cycles, and in each cycle, varies all of the parameters randomly. Assembly variation analysis that utilizes feature patterns, such as holes, for assembly is currently reliant on approximations and iterations for the assembly of parts. Such a process may introduce error, is inefficient, and requires advanced software skills for completion.

In addition to the need for assessing produced parts, there is a need to accurately determine the variation effects on patterns of features during variation analysis.

SUMMARY OF THE INVENTION

In one aspect of the present invention, a machine-readable medium is provided for programming a computer to determine positional error and remaining feature related tolerance for a plurality of manufactured internal features on an object, the medium including processor executable instructions comprising determining a true position for each of the plurality of manufactured features, determining a framework from the true positions, determining a location for each of the plurality of manufactured features, determining a size of each of the plurality of manufactured features, fitting the framework to the locations of each of the plurality of manufactured features to determine a fit framework, determining the transformed relationship between the framework and the fit framework, determining a relation for each of the plurality of manufactured features to the fit framework, organizing each of the relations into a single association, organizing the location of each of the plurality of manufactured features relative to the single association, determining the positional error for each of manufactured features from the single association, determining a common region contained within the organized plurality of manufactured features, determining a maximum inscribed circle within the region, determining the diameter of the maximum inscribed circle, determining the center location of the maximum inscribed circle, determining the transformation of the center location of the maximum inscribed circle from the single association, and determining the remaining feature related tolerance from the maximum inscribed circle.

In another aspect of the present invention, a machine-readable medium is provided for programming a computer to determine positional error and remaining hole related tolerance for a plurality of manufactured holes on an object, the medium including processor executable instructions comprising determining a true position for each of the plurality of manufactured holes, determining a feature related tolerance zone framework (FRTZF) from the true positions, determining a center for each of the plurality of manufactured holes, determining a size of each of the plurality of manufactured holes, fitting the FRTZF to the centers of the plurality of manufactured holes to determine a best fit framework, determining a transformed true position for each of the plurality of manufactured holes, superimposing each of the transformed true positions to form one true position, determining the location of each of the plurality of manufactured holes relative to the one true position, determining a common region contained within the manufactured holes represented about the one true position, determining a first maximum inscribed circle within the common region, determining the diameter of the first maximum inscribed circle, determining a center location of the first maximum inscribed circle, and determining the remaining hole related tolerance from the maximum inscribed circle.

In another aspect of the present invention, a machine-readable medium is provided for programming a computer to evaluate compliance of a single internal feature in a pattern on an object, to the virtual condition, the medium including processor executable instructions comprising providing a pattern of features, acquiring dimensions and location of a manufactured internal feature, determining a maximum inscribed circle for a pattern of features, providing a virtual condition, and determining if there is clearance between the maximum inscribed circle and the virtual condition.

In another aspect of the present invention, a machine-readable medium is provided for programming a computer to determine positional error for a plurality of manufactured holes on an object, the medium including processor executable instructions comprising determining a true position for each of the plurality of manufactured holes, determining a framework from the true positions, determining a center for each of the plurality of manufactured holes, fitting the framework to the centers of the plurality of manufactured holes to determine a best fit framework, determining a transformed true position for each of the plurality of manufactured holes, determining a one true position from the transformed true positions, determining the location of each of the plurality of manufactured holes relative to the one true position, determining a common region contained within the manufactured holes represented about the one true position, determining a first maximum inscribed circle within the common region, determining the center of the first maximum inscribed circle, and determining the location of the center of the first maximum inscribed circle relative to the one true position.

In another aspect of the present invention, a method for determining positional error and remaining feature related tolerance for a plurality of manufactured internal features on an object comprises determining a true position for each of the plurality of manufactured features, determining a framework from the true positions, determining a location for each of the plurality of manufactured features, determining a size of each of the plurality of manufactured features, fitting the framework to the locations of each of the plurality of manufactured features to determine a fit framework, determining a relation for each of the plurality of manufactured features to the fit framework, organizing each of the relations into a single association, organizing the location of each of the plurality of manufactured features relative to the single association, determining the positional error for each of manufactured features from the single association, determining a common region contained within the organized plurality of manufactured features, determining a maximum inscribed circle within the region, determining the diameter of the maximum inscribed circle, and determining the remaining feature related tolerance from the maximum inscribed circle.

In another aspect of the present invention, a machine-readable medium is provided for programming a computer to determine positional error and remaining feature relating tolerance for a plurality of manufactured external features, the medium including processor executable instructions comprising determining a true position for each of the plurality of manufactured external features, determining a feature relating tolerance zone framework (FRTZF) from the true positions, determining a center for each of the plurality of manufactured external features, determining a size of each of the plurality of manufactured external features, fitting the FRTZF to the centers of the plurality of manufactured external features to determine a best fit framework, determining a transformed true position for each of the plurality of manufactured external features, superimposing each of the transformed true positions to form a one true position, determining the location of each of the plurality of manufactured external features relative to the one true position, determining a region contained within the manufactured external features represented about the one true position, determining a first minimum circumscribing circle about the region, determining the diameter of the first minimum circumscribing circle, and determining the remaining feature related tolerance from the minimum circumscribing circle.

In another aspect of the present invention, a machine-readable medium is provided for programming a computer to evaluate compliance of a single external feature in a pattern on an object, to the virtual condition, the medium including processor executable instructions comprising providing a pattern of external features, acquiring dimensions and location of a manufactured external feature, determining a minimum circumscribing circle for a pattern of features, providing a virtual condition, and determining if there is interference between the minimum circumscribing circle and the virtual condition.

In another aspect of the present invention, a method for determining positional error and remaining feature relating tolerance for a plurality of manufactured holes on an object comprises determining a true position for each of the plurality of manufactured features, determining a framework from the true positions, determining a location for each of the plurality of holes, determining a size of each of the plurality of holes, fitting the framework to the locations of each of the plurality of holes to determine a fit framework, determining a relation for each of the plurality of holes to the fit framework, organizing each of the relations into a single association, organizing the location of each of the plurality of holes relative to the single association, determining the positional error for each of holes from the single association, determining a common region contained within the organized plurality of holes, determining a maximum inscribed circle within the region, determining the diameter of the maximum inscribed circle, and determining the remaining feature related tolerance from the maximum inscribed circle.

In another aspect of the present invention, a method for determining positional error and remaining feature relating tolerance for a plurality of manufactured external features on an object comprises determining a true position for each of the plurality of manufactured external features, determining a framework from the true positions, determining a location for each of the plurality of manufactured external features, determining a size of each of the plurality of manufactured external features, fitting the framework to the locations of each of the plurality of manufactured external features to determine a fit framework, determining a transformed true position for each of the plurality of manufactured features to the fit framework, organizing each of the transformed true positions into a one true position, organizing the location of each of the plurality of manufactured external features relative to the one true position, determining the positional error for each of manufactured external features from the single association, determining a region encompassed by the organized plurality of manufactured external features, determining a minimum circumscribing circle about the region, determining the diameter of the minimum circumscribing circle, and determining the remaining feature related tolerance from the minimum circumscribing circle.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims. References to manufactured features may equally refer to features generated in a computer simulation or features produced in fabrication processes.

The present invention provides a method for determining the size and location of manufactured features on an object, determining the translation of a pattern of features, determining tolerances consumed, and determining remaining feature tolerances. Such method may be, but not limited to, hand-implemented or implemented by a computer program. By determining remaining feature tolerances for features such as holes during or shortly after a manufacturing process, it is possible to determine how the features will interact with patterns of features on other parts. Furthermore, the data collected from each analysis of a part may be used to determine algorithms to predict future remaining feature tolerances. In an embodiment, the method may be a program implemented by a computer. The program may be distributed by, but not limited to, a machine-readable medium such as a floppy disk or a compact disk. The program may also be hardware implemented. Unlike previous methods, the present invention may acquire and assess feature sizes and feature patterns with a single iteration. Also, the present invention may acquire and utilize inspection data accurately using many methods known in the art, including, but not limited to, a coordinate measuring machine rather than paper gaging the inspection data.

The present invention provides a method for determining the size and location of simulated or manufactured features on an object, determining the transformation of a pattern of features, and determining remaining feature tolerances. Such method may be, but is not limited to being, hand-implemented or implemented by a computer program. By determining remaining feature tolerances in a simulation, design requirements can be established for mating parts and the assembly freedom between parts can be predicted. By determining remaining feature tolerances for features such as holes during or shortly after a manufacturing process, quality of assembly with other parts can be determined in advance of assembly. Furthermore, the data collected from each analysis of a part may be used to determine algorithms to predict future remaining feature tolerances. In an embodiment, the method may be a program implemented by a computer. The program may be distributed by, but not limited to, a machine-readable medium such as a floppy disk or a compact disk. The program may also be hardware implemented. Unlike previous methods, the present invention may acquire feature sizes and feature patterns with a single iteration. Also, the present invention may acquire inspection data accurately using a coordinate measuring machine rather than paper gaging the inspection data.

Figure 2:
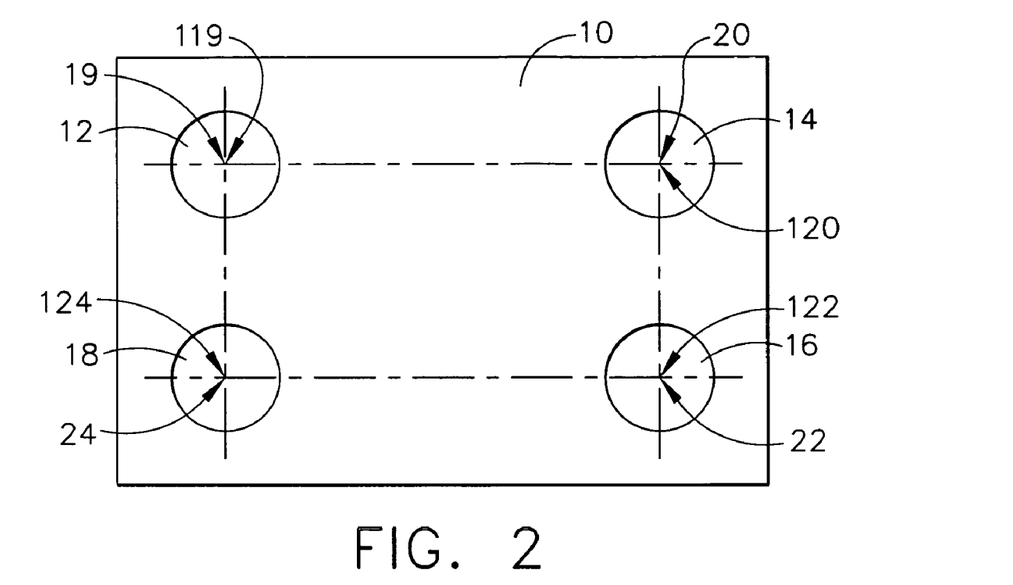
FIG. 2 is a diagram illustrating the designed features for a rectangular plate having four holes, according to an embodiment of the present invention.

In an embodiment, FIG. 2 is a diagram illustrating the designed internal features for an object such as a part. The designed part is a rectangular plate 10 having features including four spaced-apart circular holes 12, 14, 16, 18. While circular holes are used to illustrate the present invention, a feature may also be, but not limited to, polygonal and oval. Each of the designed circular holes 12, 14, 16, 18 has a center, referred to as the true center 19, 20, 22, 24, respectively, and a designed size, referred to as a true size. Each hole 12, 14, 16, 18 may have a designed position on the rectangular plate referred to as a true position. Multiple points on a feature may be used to track the position of a feature between the feature's designed position and the feature's manufactured position. For example, for a rectangular hole, points on the surface of the sides and at the corners may be used or the center of the rectangle may be used. For a circular hole, the center of the hole may be used. The true centers 19, 20, 22, 24 may be used as the true position 119, 120, 122, 124 for each hole 12, 14, 16, 18, respectively. A computer aided drafting (CAD) system may be used to render the diagram. The information of the circular holes 12, 14, 16, and 18 may be represented as digital data and stored on a machine-readable medium including a hard drive and an optical disk, as well as being processed on a computer.

Figure 3:
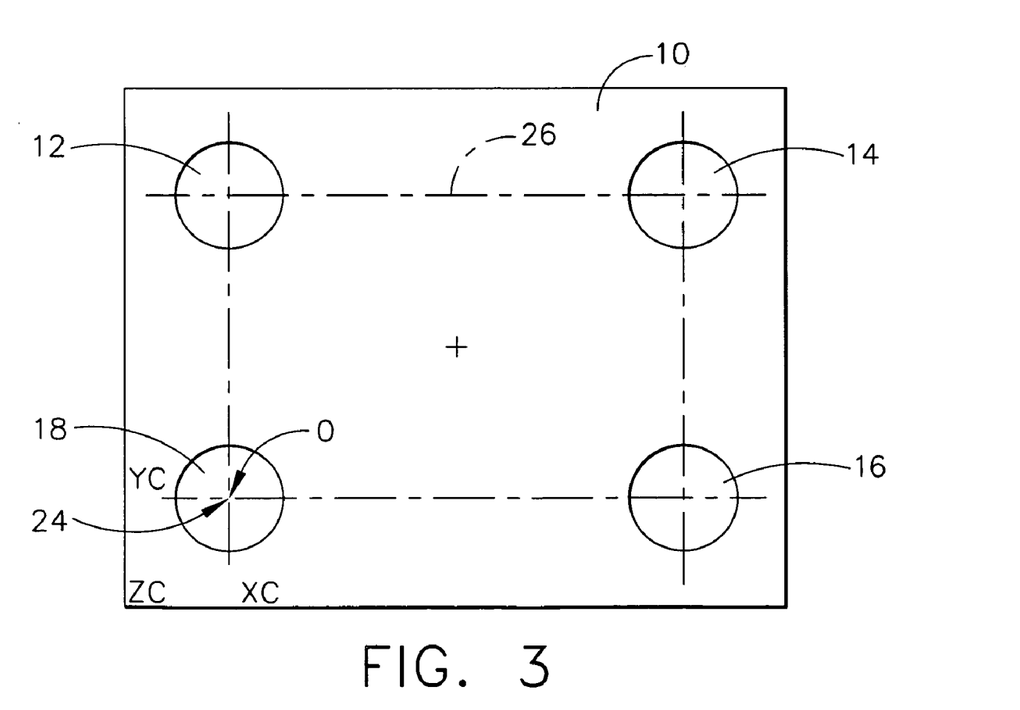
FIG. 3 is a diagram illustrating the feature related tolerance zone framework (FRTZF) for the rectangular plate in FIG. 2, according to an embodiment of the present invention.

FIG. 3 is a diagram illustrating the feature related tolerance zone framework (FRTZF) 26 for the rectangular plate 10 in FIG. 2. An FRTZF provides relational information that accounts for the tolerances of each feature, and the relation between the tolerances of each feature in relation to a whole pattern of features. For example, a four-pin plate having four pins is to be mated to the rectangular plate 10, whereby the four pins are to be inserted into holes 12, 14, 16, 18. An FRTZF for the rectangular plate 10 would provide the maximum tolerances that if exceeded, the four-pin plate could no longer mate with the rectangular plate. An xyz coordinate system for the FRTZF may use the center 24 of the bottom left circle 18 as the origin 0, and the true positions 119, 120, 122 of the other circles 12, 14, 16 as reference points (FIG. 2).

Figure 4:
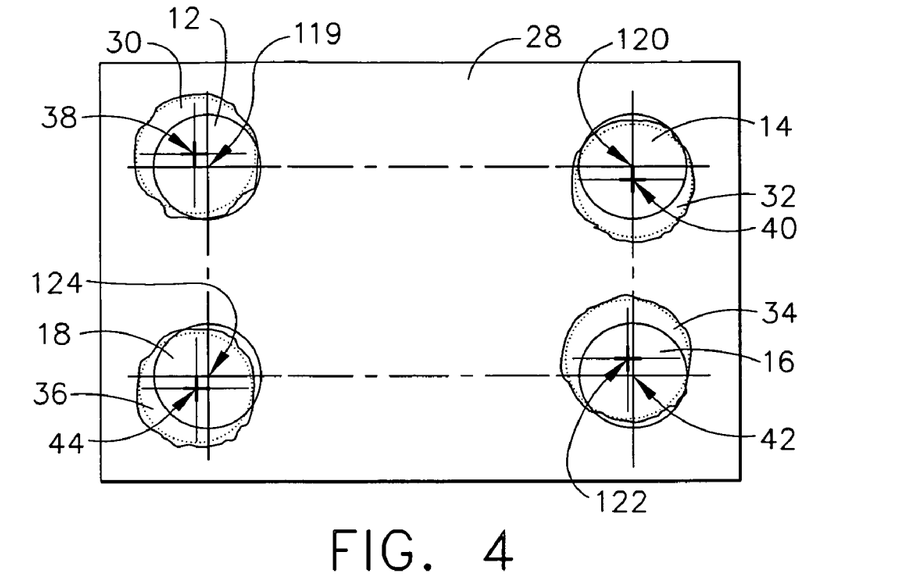
FIG. 4 is a diagram illustrating a manufactured rectangular plate, according to an embodiment of the present invention.

FIG. 4 is a diagram illustrating a real-world manufactured rectangular plate 28, created from the design illustrated in FIG. 2. The manufactured holes 30, 32, 34, and 36 correspond to designed holes 12, 14, 16 and 18. Manufactured rectangular plate 28 may also represent a simulated manufactured plate, and manufactured holes 30, 32, 34, and 36 may represent simulated manufactured holes. The simulated holes may be generated to provide a variation analysis model of a rectangular plate. Manufactured holes 30, 32, 34, and 36 may include variation from the true size and location. Designed holes 12, 14, 16 and 18 define where manufacture holes 30, 32, 34, and 36 are supposed to be. Each manufactured hole 30, 32, 34, 36 has deviated from the true size as well as the true position. A true size deviation may comprise a hole larger than designed, a hole smaller than designed, and a hole having inner surface roughness. Each hole may have a positional error relative to its true position. The positional error may be determined by the distance between center 38, 40, 42, 44 of each manufactured hole 30, 32, 34, 36 and their true positions 119, 120, 122, 124, respectively. The deviations may extend along the depth of each hole. Data regarding the dimensions and position of the manufactured rectangular plate 28 may be acquired by many methods known in the art, including, but not limited to, examining the rectangular plate 10 with a device such as a coordinate measuring machine.

Figure 5:
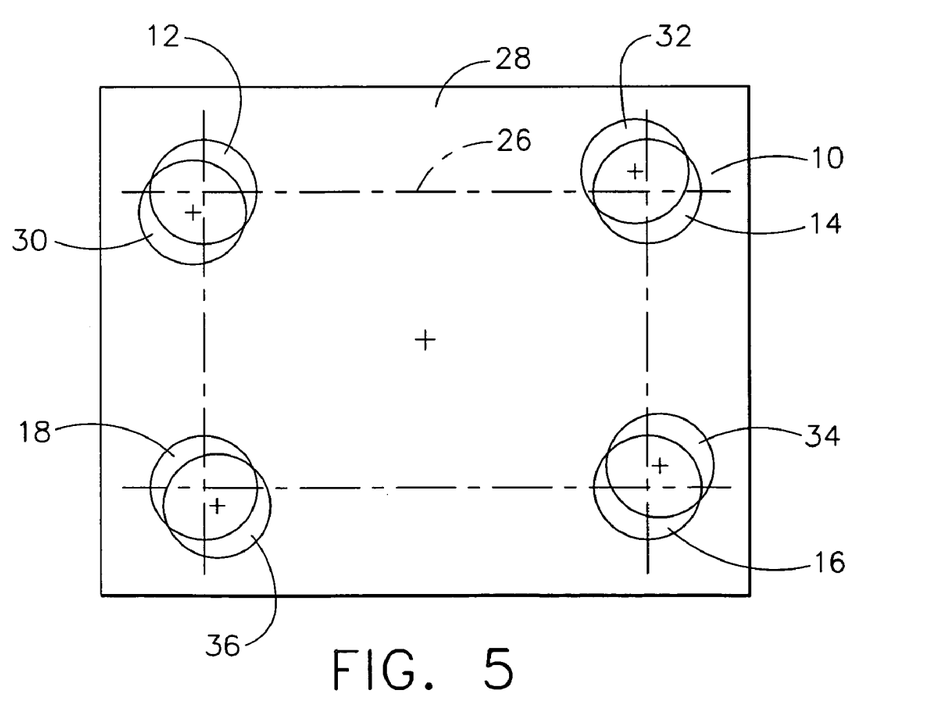
FIG. 5 is a diagram illustrating the designed pattern for a rectangular plate and manufactured holes, according to an embodiment of the present invention.

FIG. 5 is a diagram of the holes 30, 32, 34, 36 of the manufactured rectangular plate 28 from FIG. 4, superimposed over the designed pattern of the rectangular plate 10 shown in FIG. 2. The manufactured holes 30, 32, 34, 36 have positional errors and true size deviations relative to the designed pattern of the rectangular plate 10.

Figure 6:
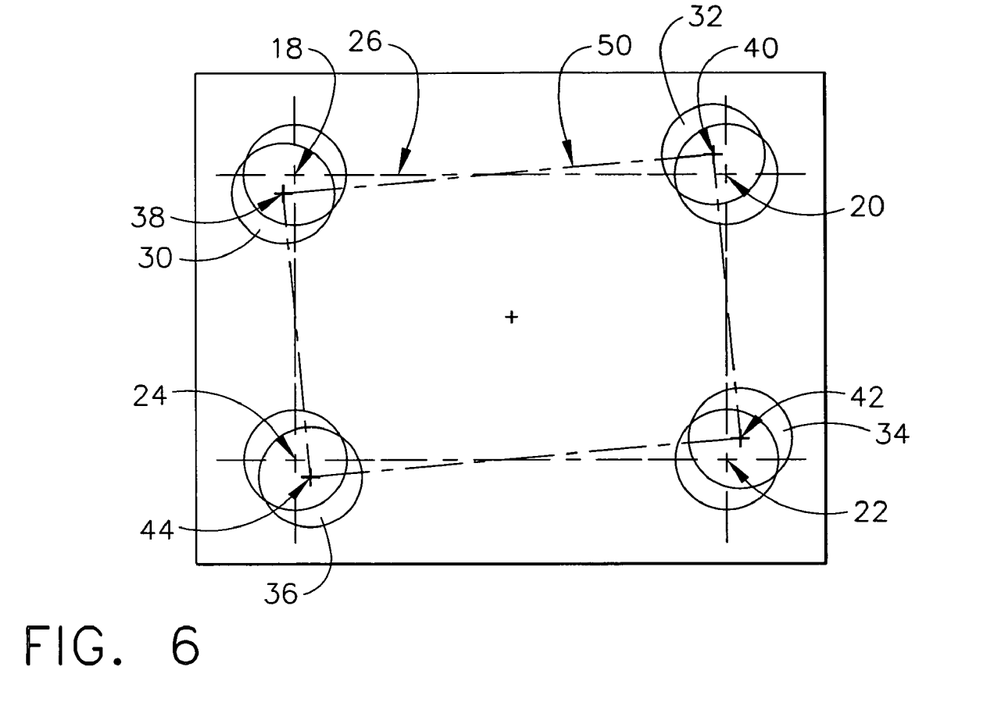
FIG. 6 is a diagram illustrating the positional errors and true positions of each manufactured hole relative to a best fit framework, according to an embodiment of the present invention.

FIG. 6 is a diagram illustrating the positional errors of each manufactured hole 30, 32, 34, 36 and the true positions 18, 20, 22, 24 of each hole, relative to a best fit tolerance zone framework (best fit framework) 50. The FRTZF 26 may be best fit to the manufactured holes 30, 32, 34, 36 by best fitting the true positions 18, 20, 22, 24 to the centers 38, 40, 42, 44 of the manufactured holes 30, 32, 34, 36, while retaining the structure of the FRTZF 26. Examples of best fit methods are well known in the art and may include, but are not limited to, a least squares or total least squares method. The best fit of the FRTZF 26 may cause the FRTZF 26 to translate and/or rotate relative to the FRTZF's original position, resulting in a best fit framework 50. Comparing the best fit framework 50 with the FRTZF 26 indicates how much the pattern of the features of the rectangular plate 10 has transformed, i.e. translated and rotated. The translation and rotation of a pattern of features may be evaluated relative to an origin located at, but not limited to, a true position of a circle, an edge of the manufactured part, a corner of a manufactured part, and a location on a part to be mated with the manufactured part.

Figure 7:
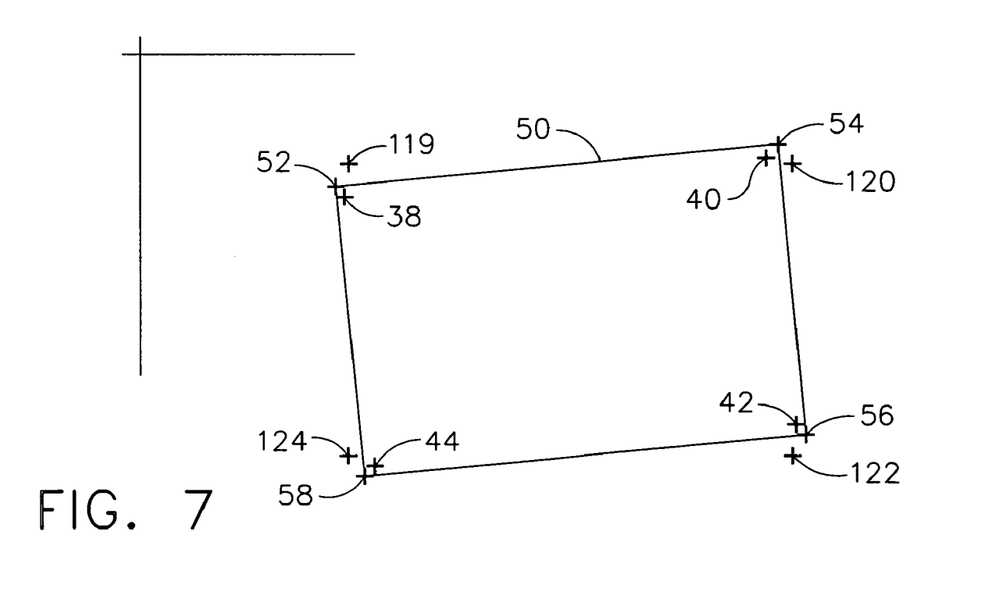
FIG. 7 is a diagram illustrating the true positions and the centers of each manufactured hole relative to a best fit framework, according to an embodiment of the present invention.

FIG. 7 is a diagram illustrating the true positions 119, 120, 122, 124 of each hole and the centers 38, 40, 42, 44 of each manufactured hole relative to the best fit framework 50. The best fit framework 50 establishes transformed true positions for each circle, where each transformed true position 52, 54, 56, 58 represents a true position 18, 20, 22, 24, respectively, that has rotated and translated with the FRTZF 26 (FIG. 6) when producing the best fit framework 50.

Figure 8:
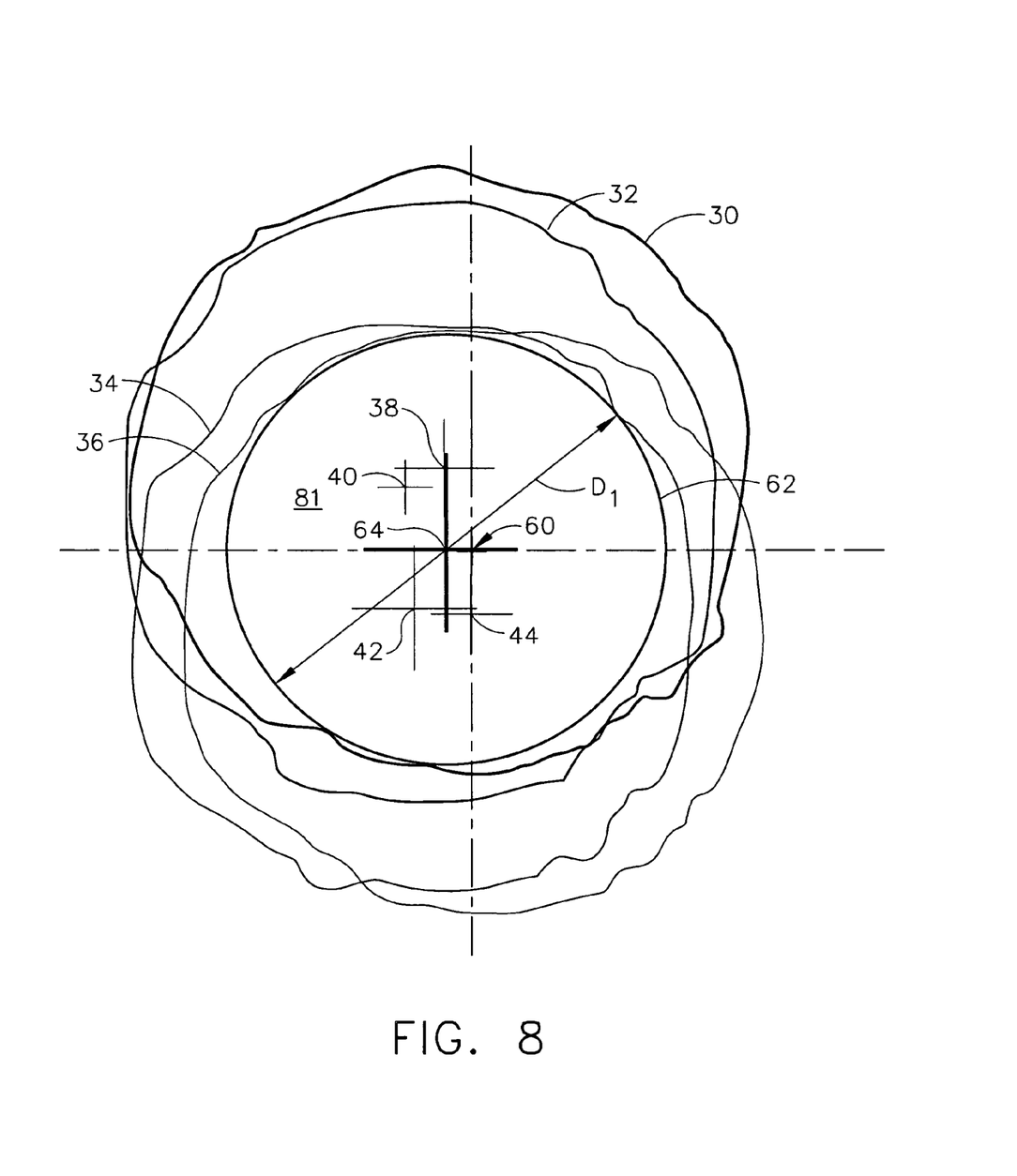
FIG. 8 is a diagram illustrating a one true position and manufactured holes relative to the one true position, according to an embodiment of the present invention.

FIG. 8 is a diagram illustrating an embodiment using the surfaces of holes using one true position and the manufactured holes 30, 32, 34, 36, relative to the one true position 60. The one true position 60 is a single association determined by superimposing each of the transformed true positions 52, 54, 56, 58 (FIG. 7) of the best fit framework 50 onto each other. The produced or simulated surfaces of the holes 30, 32, 34, 36 and centers 38, 40, 42, 44 of each manufactured hole 30, 32, 34, 36, respectively, are organized relative to the one true position 60. The dimensions of holes 30, 32, 34 and 36 may be determined by selecting a multitude of surface points on each hole 30, 32, 34, 36. The center of the manufactured hole, simulated or not simulated, may be established first. A circle 62 having the largest possible diameter is inscribed within the area 81 defined within all of the manufactured holes 30, 32, 34, 36. The center 64 of the inscribed circle 62 is compared to the one true position 60 of the circle 62 to determine the amount of translation of the pattern of features relative to the best fit framework 50 (FIG. 7). The difference between the diameter $D_1$ of the inscribed circle 62 and the virtual condition equals the remaining allowable feature relating tolerance for the pattern of holes as a group. The virtual condition is a constant boundary generated by the collective effects of a feature's specified (maximum material condition) MMC or least material condition (LMC) and the specified geometric tolerance for that material condition. For a hole, the virtual condition is equal to the MMC (the smallest size that the hole may be) minus the positional tolerance for that hole. MMC may be defined as the condition in which a feature of size contains the maximum amount of material within the stated limits of size-for example, the minimum hole diameter for a hole. LMC may be defined as the condition in which a feature of size contains the least amount of material within the stated limits of size, for example, maximum hole diameter for a hole.

Figure 9:
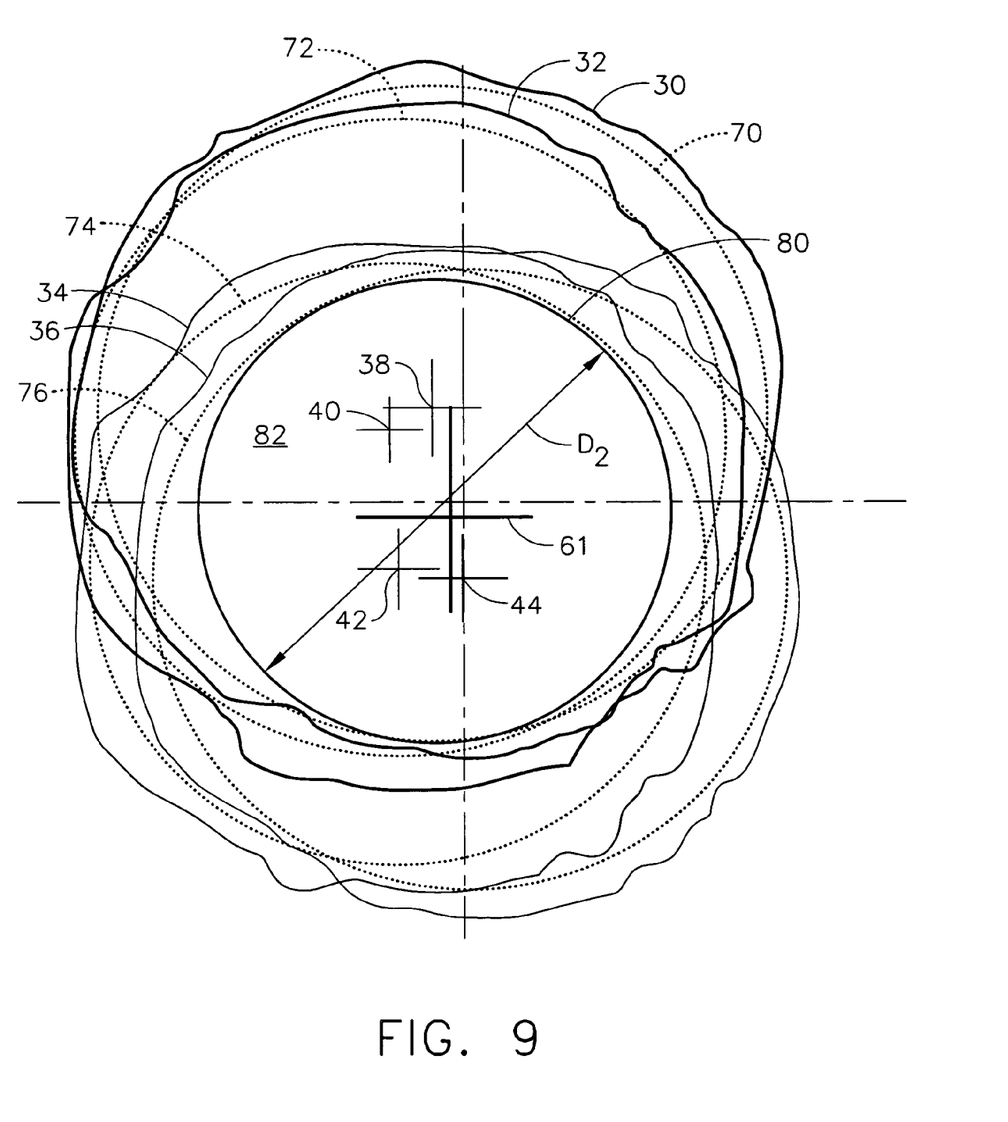
FIG. 9 is a diagram illustrating inscribed circles, manufactured holes and a one true position, according to an embodiment of the present invention.

FIG. 9 is a diagram illustrating an embodiment using inscribed circles 70, 72, 74, 76 for each manufactured hole 30, 32, 34, 36 to find a one true position 61. Similar to the procedure illustrated in FIG. 8, the one true position 60 is determined by superimposing each of the transformed true positions 52, 54, 56, 58 of the best fit framework 50 onto each other (FIG. 7). The surfaces for each of the manufactured holes 30, 32, 34, 36 is represented relative to the true center 60. A circle 70, 72, 74, 76 having the largest possible diameter is inscribed within each of the manufactured holes 30, 32, 34, 36, respectively. Centers 38, 40, 42, 44 of the produced holes 30, 32, 34, 36 are located at the centers of circles 70, 72, 74, 76. A circle 80 having a maximum diameter is then inscribed within the area 82 defined by inscribed circles 70, 72, 74, and 76. The center 61 of inscribed circle 80 is compared to the one true position 60 (FIG. 8) to determine the amount of translation of the pattern of features relative to the best fit framework 50. The difference between the diameter $D_2$ of inscribed circle 80 and the virtual condition equals the remaining allowable feature relating tolerance.

Figure 10:
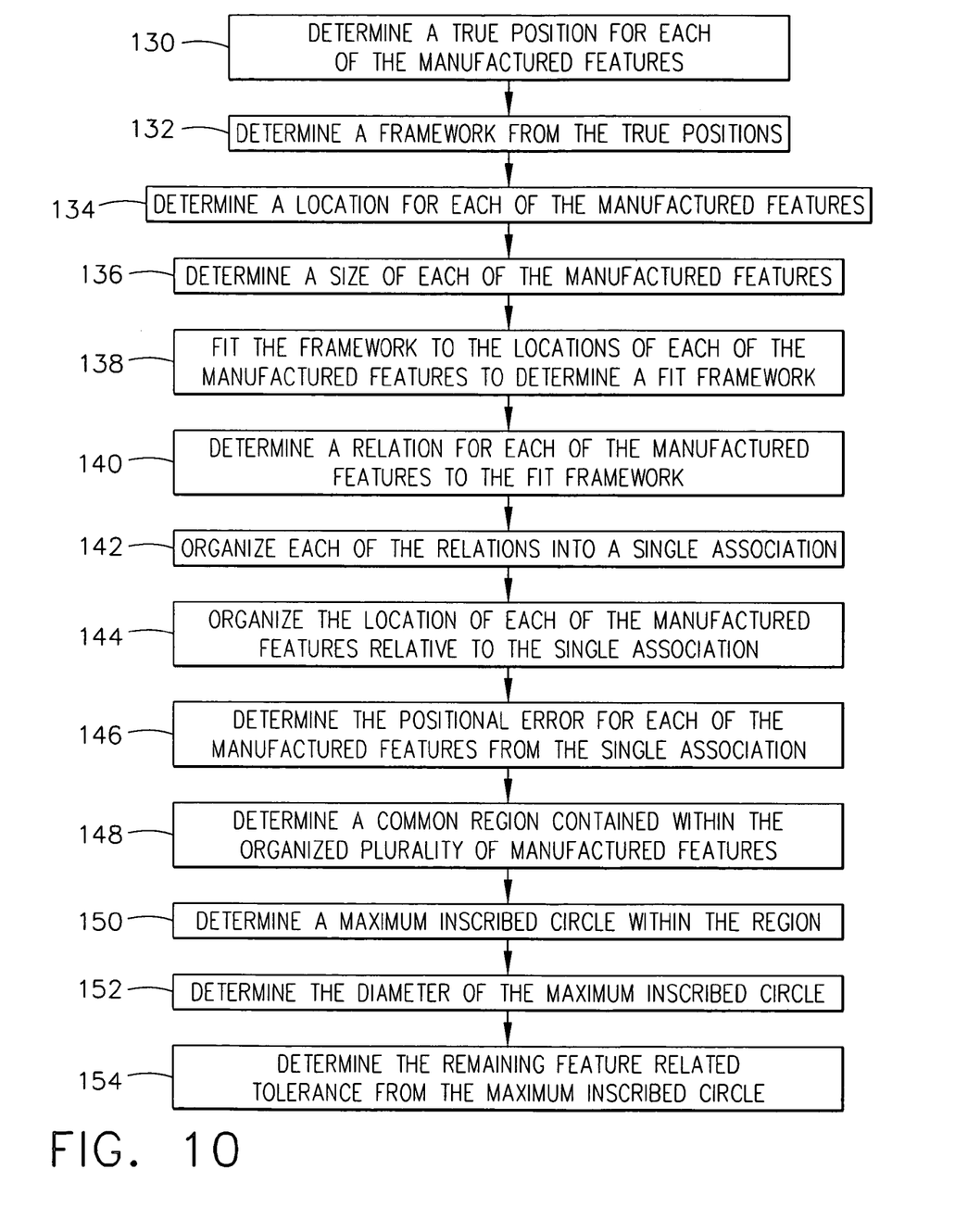
FIG. 10 is a flowchart illustrating a method for determining the positional error and remaining feature related tolerance for a pattern of internal features on an object, according to an embodiment of the present invention.

FIG. 10 is a flowchart illustrating an embodiment of a method for determining the positional error and remaining feature related tolerance for a pattern of internal features on an object. Positional error and remaining feature related tolerance for a pattern of internal features may be determined by a step of determining 130 a true position for each of the manufactured features. An example of step 130 may be found in the description of FIG. 3. Another step of determining positional error and remaining feature related tolerance for a pattern of internal features may include a step of determining 132 a framework from the true positions. An example of step 132 may be found in the description of FIG. 4. Another step may include a step of determining 134 a location for each of the manufactured features. An example of step 134 may be found in the description of FIG. 4. Another step may include a step of determining 136 a size of each of the manufactured features. An example of step 136 may be found in the description of FIG. 4. Another step of determining positional error and remaining feature related tolerance for a pattern of internal features may include a step of fitting 138 the framework to the locations of each of the manufactured features to determine a fit framework. An example of step 138 may be found in the description of FIG. 6.

Still referring to FIG. 10, another step of determining positional error and remaining feature related tolerance for a pattern of internal features may include a step of determining 140 a relation for each of the manufactured features to the fit framework. An example of step 140 may be found in the description of FIG. 6. Another step may include a step of organizing 142 each of the relations into a single association. An example of step 142 may be found in the description of FIG. 8. Another step may include a step of organizing 144 the location of each of the manufactured features relative to the single association. An example of step 144 may be found in the description of FIG. 8. Another step may include a step of determining 146 the positional error for each of the manufactured features from the single association. An example of step 146 may be found in the description of FIG. 8. Another step may include a step of determining 148 a common region contained within the organized plurality of manufactured features. An example of step 148 may be found in the description of FIG. 8. Another step may include a step of determining 150 a maximum inscribed circle within the region. An example of step 150 may be found in the description of FIG. 8. Another step may include a step of determining 152 the diameter of the maximum inscribed circle. An example of step 152 may be found in the description of FIG. 8. And, another step may include a step of determining 154 the remaining feature related tolerance from the maximum inscribed circle. An example of step 154 may be found in the description of FIG. 8.

Figure 11:
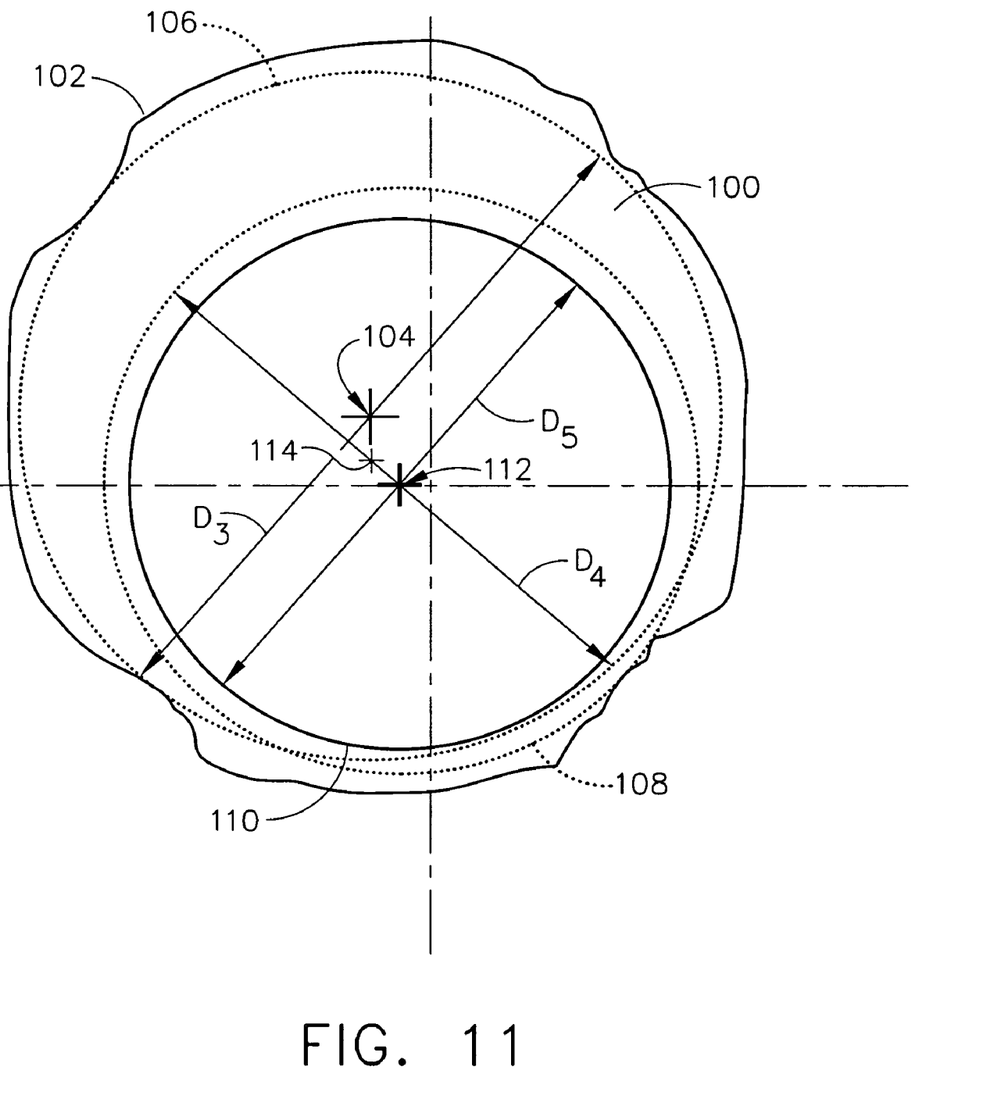
FIG. 11 is a diagram illustrating an internal feature and a virtual condition, according to an embodiment of the present invention.

FIG. 11 is a diagram illustrating one embodiment where an internal feature such as a hole 100 is evaluated on an individual basis to determine if the feature violates the virtual condition of the feature relating tolerance, and if so, how the feature may be modified. The hole 100 has a feature surface 102 and a feature center 104. A circle 106 may be inscribed within hole 100 having the maximum possible diameter. A virtual condition circle 108 representing the virtual condition may be drawn with a center 112 located at the same center as for the maximum inscribed circle 110 for the pattern. A maximum inscribed circle for the pattern 110 may also be represented. A maximum inscribed circle for the pattern 110 is a circle for the hole 100 that fits in the feature pattern. The feature pattern translation is determined by calculating the positional difference between the maximum inscribed circle center 112 and the center 114 of inscribed circle 106 for the hole 100. Inscribing diameter $D_3$ represents the usable diameter of the hole 100 for a single fastener or mating part to be inserted within the hole 100. Diameter $D_5$ represents the usable diameter of the pattern of holes in the part.

Still referring to FIG. 11, the maximum inscribed circle 110 for the pattern is smaller than the virtual condition circle 108, and thus one or more features violate the tolerance requirements of the virtual condition, resulting in interference between the hole and another object such as a fastener or mating part. If the maximum inscribed circle 110 for the pattern is larger than the virtual condition circle 108, there is clearance between the hole and another object such as a fastener or mating part. Feature violations may include, but are not limited to, feature size, pattern translation and feature translation relative to the pattern. The combined total of all the feature violations is the difference between the diameter $D_5$ of the maximum inscribed circle for the pattern 110 and the diameter $D_4$ of the virtual condition circle 108. Feature size and location may be altered to eliminate violations of the virtual condition. Feature size for the hole may be altered by first determining the difference between the minimum tangent radius from center 112 to circle 106 and the virtual condition radius. The hole location may be altered along a vector between the hole center 104 and the virtual condition center 112.

Figure 12:
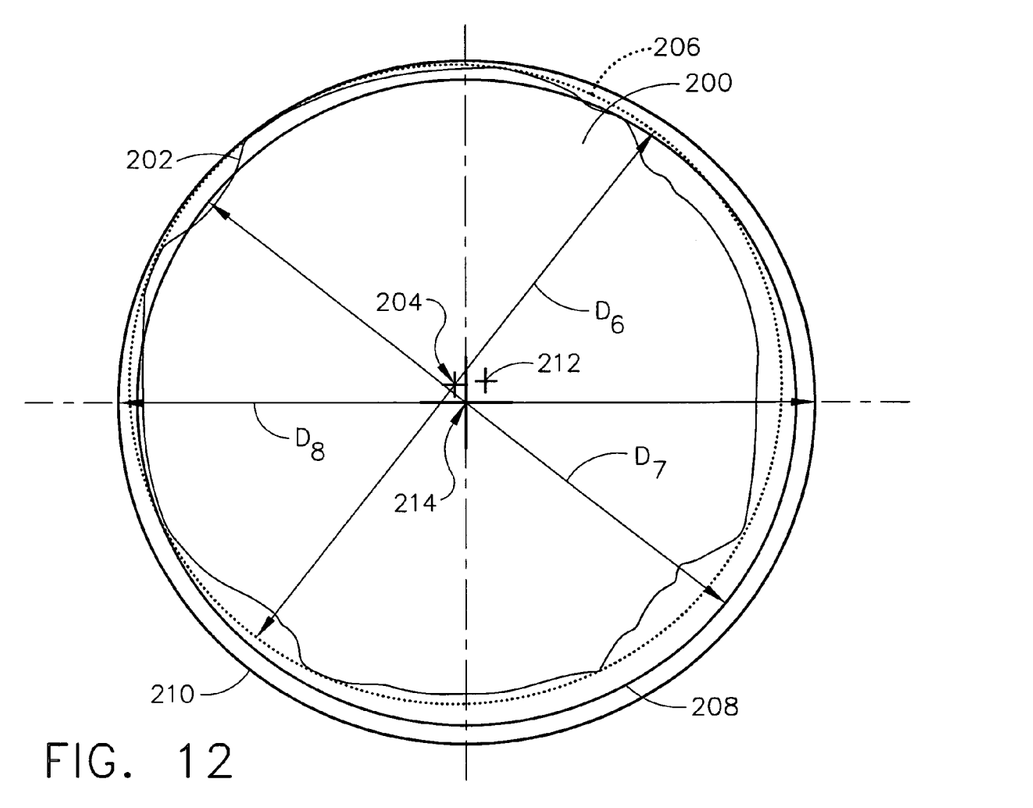
FIG. 12 is diagram illustrating an external feature and a virtual condition, according to an embodiment of the present invention.

FIG. 12 is a diagram illustrating an embodiment where an external feature such as a pin 200 is evaluated on an individual basis to determine if the feature violates the virtual condition, and if so, how the feature may be modified. The pin 200 has a feature surface 202 and a feature center 204. A circle 206 may be circumscribed about pin 200 having the minimum possible diameter. A virtual condition circle 208 representing the virtual condition may be drawn relative to the pin 200. A minimum circumscribing circle for the pattern 210 may also be represented. A minimum circumscribing circle for the pattern 210 is a circle for the pin 200 that fits in the feature pattern. The feature pattern translation is determined by calculating the positional difference between the true position 212 and the center 214 of circumscribing circle 206 for the pin 200. The diameter $D_6$ of the minimum circumscribing circle 206 represents the effective diameter of the pin 200 when inserted within a hole.

Still referring to FIG. 12, the minimum circumscribing circle 210 for the pattern is larger than the virtual condition circle 208, and thus one or more features violate the tolerance requirements of the virtual condition, resulting in interference between the pin 200 and the hole into which the pin 200 will be inserted. Feature violations may include, but are not limited to, feature size, pattern translation and feature translation relative to the pattern. The combined total of all the feature violations is the difference between the diameter $D_8$ of the minimum circumscribing circle for the pattern 210 and the diameter $D_7$ of the virtual condition circle 208. Feature size and location may be altered to eliminate violations of the virtual condition. Feature size for pin 200 may be altered by first determining the interference between the pin surface 202 and the virtual condition circle 208. The pin 200 location may be altered by determining the pin location relative to the minimum circumscribing circle for the pattern 210 and then moving the pin location.

Figure 13:
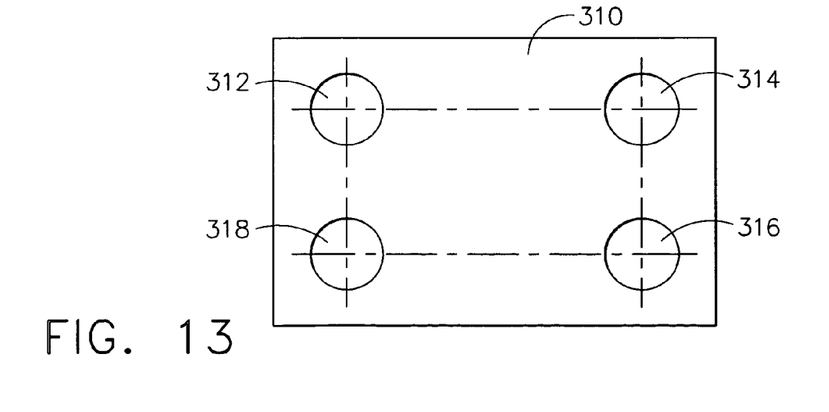
FIG. 13 is a diagram illustrating the designed features for a rectangular plate having four pins, according to an embodiment of the present invention.

FIG. 13 is a diagram illustrating the designed external features for an object such as a rectangular plate 310 having four spaced-apart pins 312, 314, 316, 318 extending from one side of the rectangular plate 310.

Figure 14:
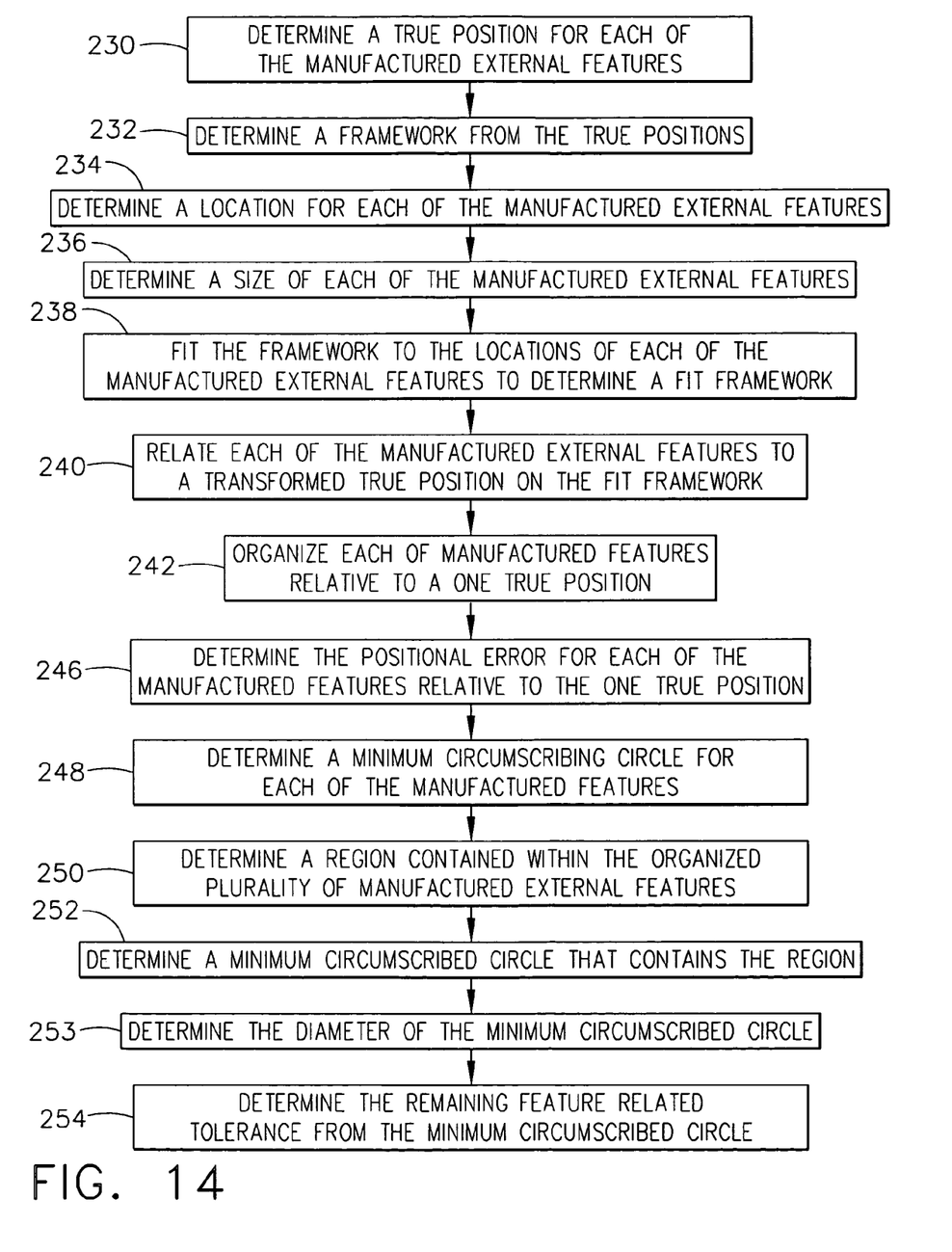
FIG. 14 is a flowchart illustrating a method for determining the positional error and remaining feature related tolerance for a pattern of external features on an object, according to an embodiment of the present invention.

Referring to FIG. 14, in an embodiment, determining the combined remaining feature related tolerances and the amount of translation of the pattern of external features for a pattern, such as for the rectangular plate shown in FIG. 13, may comprise a step of determining 230 a true position for each of the manufactured external features. An example of step 230 may be found in the description of FIG. 3. Another step may include a step of determining 232 a framework from the true positions. An example of step 232 may be found in the description of FIG. 6. Another step may include a step of determining 234 a location for each of the manufactured external features. An example of step 234 may be found in the description of FIG. 4. Another step may include a step of determining 236 a size of each of the manufactured external features. An example of step 236 may be found in the description of FIG. 4. Another step may include a step of fitting 238 the framework to the locations of each of the manufactured external features to determine a fit framework. An example of step 238 may be found in the description of FIG. 6. Another step may include a step of relating 240 each of the manufactured external features to a transformed true position on the fit framework. An example of step 240 may be found in the description of FIG. 8. Another step may include a step of organizing 242 each of the manufactured features relative to a one true position. An example of step 242 may be found in the description of FIG. 8. Another step may include a step of determining 246 the positional error for each of the manufactured features relative to the one true position. An example of step 246 may be found in the description of FIG. 8.

Figure 15:
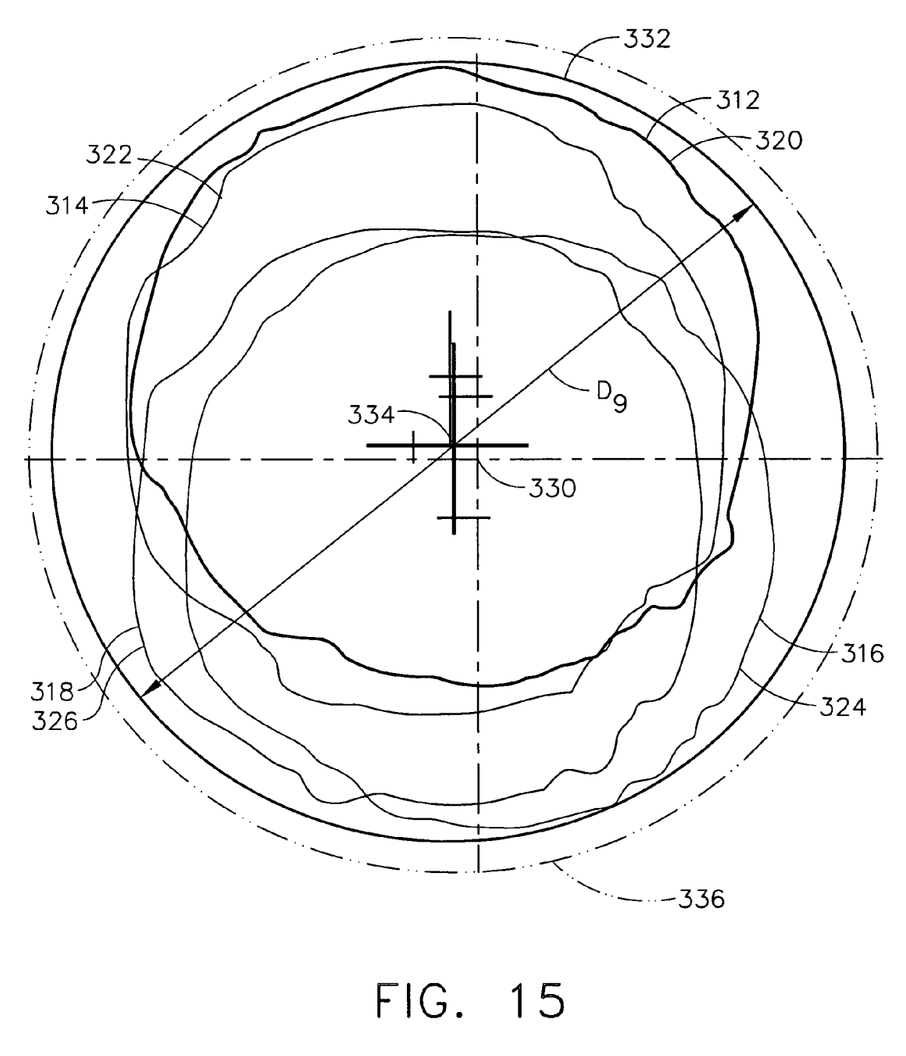
FIG. 15 is a diagram illustrating manufactured external features and a one true position, according to an embodiment of the present invention.

Referring also to FIG. 15 and following the discussion of FIG. 14, determining the combined remaining feature related tolerances and the amount of translation of the pattern of external features for a pattern may include a step of determining 248 a minimum circumscribing circle for each of the manufactured features, a step of determining 250 a region contained within the organized plurality of manufactured external features, a step of determining 252 a minimum circumscribed circle that contains the region, a step of determining 253 the diameter of the minimum circumscribed circle, and a step of determining 254 the remaining feature related tolerance from the minimum circumscribed circle.

FIG. 15 is a diagram illustrating an embodiment of the step of determining 250 a region contained within the organized plurality of manufactured external features, as well steps 252, 253 and 254 described in FIG. 14. The surface features 320, 322, 324, 326 of four manufactured pins 312, 314, 316, 318, respectively, are shown superimposed about a one true position 330. A minimum circumscribing circle 332 is drawn that encompasses each of the four superimposed manufactured pins 312, 314, 316, 318. The diameter $D_9$ of the minimum circumscribing circle 332 may represent the utilized diameter of the four manufactured pins 312, 314, 316, 318. The location of the center 334 of the minimum circumscribing circle 332 relative to the one true position 330 may indicate the amount of translation of the pattern of manufactured pins 312, 314, 316, 318 relative to the fit framework. The difference in area or diameter between the minimum circumscribing circle 332 and the virtual condition circle 336 equals the amount of remaining allowable feature relating tolerance. If the minimum circumscribing circle 332 is larger than the virtual condition circle 336, then the pattern of manufactured pins 312, 314, 316, 318 violate the virtual condition.

Figure 16:
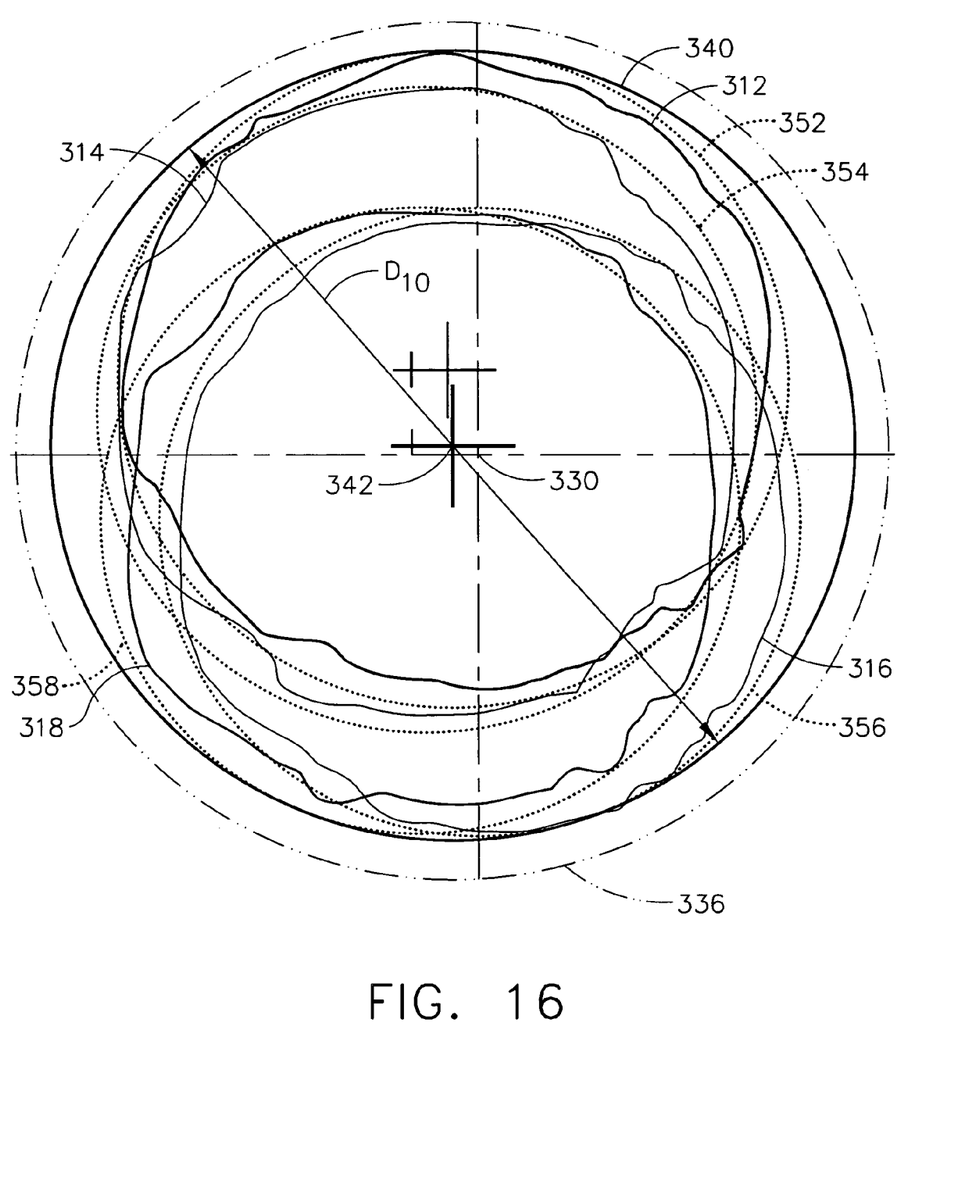
FIG. 16 is a diagram illustrating manufactured external features, circumscribing circles, and a one true position, according to an embodiment of the present invention.

FIG. 16 is a diagram illustrating another embodiment of the step of determining 250 a region contained within the organized plurality of manufactured external features described, as well steps 252, 253 and 254 described in FIG. 14. The four manufactured pins 312, 314, 316, 318, respectively, are shown superimposed about a one true position 330. Circumscribing circles 352, 354, 356, 358 are drawn for each of the manufactured pins 312, 314, 316, 318, respectively. A minimum circumscribing circle 340 is drawn that includes each of the four circumscribing circles 312, 314, 316, 318. The diameter $D_{10}$ of the minimum circumscribing circle 340 may represent the utilized diameter of the four manufactured pins 312, 314, 316, 318. The location of the center 342 of the minimum circumscribing circle 340 relative to the one true position 330 may indicate the amount of translation of the pattern of manufactured pins 312, 314, 316, 318 relative to the fit framework. The difference in diameter between the minimum circumscribing circle 340 and the virtual condition circle 336 equals the amount of remaining allowable feature relating tolerance.

It should be understood, of course, that the foregoing relates to preferred embodiments of the invention and that modifications may be made without departing from the spirit and scope of the invention as set forth in the following claims.

I claim:

1. A machine-readable medium for programming a computer to determine positional error and remaining feature relating tolerance for a plurality of manufactured external features, said medium including processor executable instructions comprising:

determining a true position for each of said plurality of manufactured external features;

determining a feature relating tolerance zone framework (FRTZF) from said true positions;

determining a center for each of said plurality of manufactured external features;

determining a size of each of said plurality of manufactured external features;

fitting said FRTZF to said centers of said plurality of manufactured external features to determine a best fit framework;

determining a transformed true position for each of said plurality of manufactured external features;

superimposing each of said transformed true positions to form a one true position;

determining the location of each of said plurality of manufactured external features relative to said one true position;

determining a region encompassing said manufactured external features represented about said one true position;

determining a first minimum circumscribing circle about said region;

determining the diameter of said first minimum circumscribing circle; and determining said remaining feature related tolerance from said minimum circumscribing circle.

2. The machine-readable medium of claim 1 where said processor executable instruction of determining a feature relating tolerance zone framework (FRTZF) from said true positions comprises providing allowable size tolerances; and providing positional tolerances.

3. The machine-readable medium of claim 1 where said processor executable instruction of determining a center for each of said plurality of manufactured external features comprises
  acquiring the dimensions of said manufactured external features with a coordinate measuring machine;
  determining a second minimum circumscribing circle for each of said manufactured external features; and
  determining a center for each of said second minimum circumscribing circles.

4. The machine-readable medium of claim 1 where said processor executable instruction of determining a size of each of said plurality of manufactured external features comprises analyzing said plurality of manufactured external features with a measuring device.

5. The machine-readable medium of claim 1 where said processor executable instruction of determining a region encompassing said manufactured external features represented about said one true position comprises
  acquiring dimensions of each of said manufactured external features; and
  determining an area encompassing each of said manufactured external features.

6. The machine-readable medium of claim 5 where said processor executable instruction of determining said remaining feature relating tolerance from said minimum circumscribing circle comprises
  providing a virtual condition for said manufactured external features; and
  determining the difference between the diameter of the first minimum circumscribing circle and said virtual condition.

7. The machine-readable medium of claim 1 where said processor executable instruction of determining a region encompassing said manufactured external features represented about said one true position comprises
  acquiring dimensions of each of said manufactured external features;
  determining a second minimum circumscribing circle for each of said manufactured external features; and
  determining an area encompassing each of said second minimum circumscribing circles.

8. The machine-readable medium of claim 7 where said processor executable instruction of determining said remaining hole relating tolerance from said minimum circumscribing circle comprises
  providing a virtual condition for said manufactured external features; and
  determining the difference between the diameter of the first minimum circumscribing circle and the virtual condition.

9. The machine-readable medium of claim 1 where said plurality of manufactured external features are simulated manufactured external features.

10. A method for determining positional error and remaining feature relating tolerance for a plurality of manufactured external features on an object, comprising:
  determining a true position for each of said plurality of manufactured external features;
  determining a framework from said true positions;
  determining a location for each of said plurality of manufactured external features;
  determining a size of each of said plurality of manufactured external features;
  fitting said framework to said locations of each of said plurality of manufactured external features to determine a fit framework;
  determining a transformed true position for each of said plurality of manufactured external features to said fit framework;
  organizing each of said transformed true positions into a one true position;
  organizing the location of each of said plurality of manufactured external features relative to said one true position;
  determining said positional error for each of said plurality of manufactured external features from said one true position;
  determining a region encompassed by said organized plurality of manufactured external features;
  determining a minimum circumscribing circle about said region;
  determining the diameter of said minimum circumscribing circle;
  determining said remaining feature related tolerance from said minimum circumscribing circle; and
  storing said remaining feature related tolerance on a machine-readable medium for subsequent use.

11. The method of claim 10 where said step of fitting said framework to said locations of each of said plurality of manufactured external features to determine a fit framework comprises:
  determining a center for each of a plurality of manufactured pins; and
  best fitting true positions of said manufactured pins to centers of said manufactured pins.

12. The method of claim 10 where said step of determining a transformed true position for each of said plurality of manufactured external features to said fit framework comprises
  determining a center for a plurality of manufactured pins;
  determining transformed true positions for each of said manufactured pins; and
  determining locations of said centers of said manufactured pins from said transformed true positions.

13. The method of claim 10 where said plurality of manufactured external features are simulated manufactured external features.

* * * * *